United States Patent
Schmitz et al.

(10) Patent No.: US 9,340,132 B2
(45) Date of Patent: May 17, 2016

(54) HEADREST, IN PARTICULAR FOR A MOTOR VEHICLE

(75) Inventors: Andreas Schmitz, Burscheid (DE); Henrik Völker, Burscheid (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 207 days.

(21) Appl. No.: 13/703,321

(22) PCT Filed: Jun. 8, 2011

(86) PCT No.: PCT/EP2011/002805
§ 371 (c)(1),
(2), (4) Date: Feb. 14, 2013

(87) PCT Pub. No.: WO2011/154130
PCT Pub. Date: Dec. 15, 2011

(65) Prior Publication Data
US 2013/0234491 A1  Sep. 12, 2013

(30) Foreign Application Priority Data

Jun. 11, 2010  (DE) .......................... 10 2010 023 403

(51) Int. Cl.
*B60N 2/48*  (2006.01)

(52) U.S. Cl.
CPC ............ *B60N 2/4864* (2013.01); *B60N 2/4841* (2013.01); *B60N 2/4847* (2013.01); *B60N 2/4885* (2013.01)

(58) Field of Classification Search
CPC .. B60N 2/4852; B60N 2/4847; B60N 2/4885; B60N 2/4841; B60N 2/4864
USPC .......................................................... 297/408
See application file for complete search history.

(56) References Cited

U.S. PATENT DOCUMENTS

| | | | | |
|---|---|---|---|---|
| 4,674,792 A | * | 6/1987 | Tamura et al. ................. | 297/408 |
| 4,674,797 A | * | 6/1987 | Tateyama ....................... | 297/408 |
| 5,238,295 A | * | 8/1993 | Harrell ................. | B60N 2/4847 |
| | | | | 297/391 |

(Continued)

FOREIGN PATENT DOCUMENTS

| | | |
|---|---|---|
| DE | 100 47 406 A1 | 4/2002 |
| DE | 102 02 598 A1 | 8/2003 |

(Continued)

OTHER PUBLICATIONS

International Search Report in connection with International Application No. PCT/EP2011/002805 dtd Aug. 1, 2012.

(Continued)

*Primary Examiner* — David R Dunn
*Assistant Examiner* — Tania Abraham
(74) *Attorney, Agent, or Firm* — Foley & Lardner LLP

(57) ABSTRACT

A headrest for a vehicle seat, in particular for a motor vehicle seat, is proposed. The headrest includes a padded part facing the head of a seat occupant, a basic part and a comfort-adjustment device. When the headrest is in use, the padded part can be adjusted by the comfort-adjustment device relative to the basic part from a first position, in which it is further away from the head of the seat occupant, into a second position, closer to the head of the seat occupant. The comfort-adjustment device has two control elements which can be set in a locking position and in an unlocking position, the movement of the control elements being synchronized.

4 Claims, 3 Drawing Sheets

(56) References Cited

U.S. PATENT DOCUMENTS

| | | | |
|---|---|---|---|
| 5,738,412 A * | 4/1998 | Aufrere et al. | 297/408 |
| 5,842,738 A * | 12/1998 | Knoll | B60N 2/4847 297/216.12 |
| 6,045,181 A | 4/2000 | Ikeda et al. | |
| 6,511,130 B2 * | 1/2003 | Dinkel et al. | 297/410 |
| 6,520,585 B1 * | 2/2003 | Georg et al. | 297/408 |
| 6,616,235 B1 * | 9/2003 | Khavari et al. | 297/408 |
| 6,802,562 B1 * | 10/2004 | Hake et al. | 297/216.12 |
| 7,195,313 B2 * | 3/2007 | Hippel et al. | 297/216.12 |
| 7,325,877 B2 * | 2/2008 | Brockman et al. | 297/408 |
| 7,520,564 B2 * | 4/2009 | Woerner | 297/216.12 |
| 7,559,608 B2 * | 7/2009 | Miyahara et al. | 297/408 |
| 2008/0290713 A1 | 11/2008 | Oda | |

FOREIGN PATENT DOCUMENTS

| | | |
|---|---|---|
| DE | 10 2006 046 975 A1 | 5/2007 |
| EP | 1 193 114 A1 | 4/2002 |
| EP | 1 491 394 A1 | 12/2004 |
| GB | 2 336 304 A | 10/1999 |
| JP | 58-121913 A | 7/1983 |
| JP | 62-181256 U | 11/1987 |
| JP | 11-262427 A | 9/1999 |
| KR | 10-0229441 B1 | 11/1999 |
| WO | WO-2005/097545 A2 | 10/2005 |

OTHER PUBLICATIONS

International Preliminary Report on Patentability received in connection with international appl[lication No. PCT/EP2011/002805; dtd Dec. 27, 2012.

Office Action received in Japanese Application No. 2013-513578 dated Feb. 25, 2014. (with translation).

Office Action dated Sep. 3, 2014, received in corresponding Chinese application No. 201180038166.7, and English translation, 12 pages.

* cited by examiner

HEADREST, IN PARTICULAR FOR A MOTOR VEHICLE

CROSS REFERENCE TO RELATED APPLICATIONS

The present application is a National Stage of International Application No. PCT/EP2011/002805 filed on Jun. 8, 2011, which claims the benefit of German Patent Application No. 10 2010 023 403.6 filed on Jun. 11, 2010, the entire disclosures of which are incorporated herein by reference.

The invention relates to a headrest, in particular for a motor vehicle.

Printed publication WO 2005/097545 A2 discloses a headrest for a vehicle seat in which at least one part of the headrest, said part facing the head of the seat occupant, can be moved out of a position of use toward the head of the seat occupant and into a safety position through the action of a driving device in response to an accident. Similar headrests are also known from printed publications DE 100 47 406 A1, DE 10 2006 046 975 A1 and EP 1 491 394 A1.

Printed publication DE 102 02 598 A1 furthermore discloses a headrest for a vehicle seat, in which a comfort-adjustment means is implemented.

To actuate comfort adjustment and/or alter the comfort-adjustment device, it is often necessary to actuate an operating element, such as a pushbutton or the like, and this leads to reduced safety while driving and furthermore also leads to a loss of convenience.

It is therefore the underlying object of the invention to provide a headrest for a vehicle seat with increased functionality, improved convenience, enhanced utility and further enhanced safety in use over the prior art.

The present invention can be used in conjunction with headrests in accordance with WO 2005/097545 A2 cited above, the disclosure of which is hereby incorporated fully by reference in order to avoid repetitions.

The object is achieved by a headrest for a vehicle seat, in particular for a motor vehicle seat, wherein the headrest comprises a padded part facing the head of a seat occupant, a main body and a comfort-adjustment device, wherein, when the headrest is in use, the padded part can be adjusted by means of the comfort-adjustment device relative to the main body from a first position, in which it is further away from the head of the seat occupant, into a second position, closer to the head of the seat occupant, wherein the comfort-adjustment device has two control elements, which can be set in a locking position and in an unlocking position, the movement of the control elements being synchronized.

This makes it possible in a simple way to achieve a simple and robust means of adjustment by virtue of the fact that two control elements are mounted on the headrest, on both sides for example, and thus lead to greater stability for the headrest than is the case in the presence of just a single control element, while nevertheless achieving an adjustment means for the headrest that is capable of being used and of functioning without problems and also over a long service life of the product.

According to the invention, it is particularly preferred if the control elements are connected to one another by means of a synchronization rod, thereby making possible simple and reliable synchronization of the control elements.

According to the invention, it is particularly preferred if the comfort-adjustment device has two control elements, which can be set in a locking position and in an unlocking position, wherein a direct movement of the padded part from the first position to the second position is possible when the control elements are in the locking position, but a movement of the padded part in the opposite direction is blocked, and, when the control elements are in the unlocking position, a direct movement of the padded part from the first position to the second position and from the second position to the first position is possible.

It is thereby possible, according to the invention, to control the locking of the positioning of the padded part by simple means without the need to actuate further operating elements.

According to the invention, it is particularly preferred if the padded part can also be adjusted by means of the comfort-adjustment device from the second position in the direction of the first position, this requiring the setting of an extreme forward position of the padded part.

It is thereby possible in a simple way, simply by adjusting the padded part to the extreme forward position, to achieve adjustability of the padded part such that it is possible, not only, starting from a rearward (first) setting of the padded part (i.e. a setting further away from the head of the vehicle occupant), to achieve a forward (second) setting of the padded part (i.e. a setting closer to the head of the vehicle occupant), but also, starting from a forward (second) setting of the padded part (i.e. a setting closer to the head of the vehicle occupant), to achieve a rearward (first) setting of the padded part (i.e. a setting further away from the head of the vehicle occupant) without actuating operating elements, simply by the padded part being moved into an extreme (forward) position (and, if appropriate, subsequently additionally also into another extreme (rearward) position) and then into the desired position of adjustment.

According to the invention, it is furthermore preferred if the movement of the padded part for comfort adjustment is a pivoting movement of the padded part about an axis of rotation extending substantially horizontally. This is a simple way of enabling one-handed operation of the adjustment of the padded part.

It is furthermore preferred, according to the invention, if the adjustment force required to move the padded part from the first position thereof toward the second position thereof is increased in the region of the extreme position or, if the padded part is adjustable into a plurality of latching positions, the adjustment force required for adjustment from the first position toward the second position of the padded part is increased after the last latching position before the extreme position.

It is thereby advantageously possible, according to the invention, for the last latching position or detent position of the padded part before unlocking to be recognized reliably and clearly by the user. In particular, this is a simple and advantageous way of enabling the last latching position before unlocking (i.e. before the extreme position of the padded part) to be set reliably even in the case of first-time operation of the comfort-adjustment means. Another advantage is that the comfort-adjustment mechanism of the padded part is not unlocked accidentally (or unintentionally). In particular, this results in a higher degree of convenience and a greater degree of safety since it involves less distraction for a driver of a vehicle from traffic, for example.

An embodiment of the invention, which is to be taken as purely illustrative, is described below with reference to the attached drawings.

FIG. 1 shows a schematic section through a headrest 1 having a comfort-adjustment mechanism 5 and a headrest configured in accordance with the invention for a motor vehicle seat.

FIG. 2 shows two schematic detail views of a headrest according to the invention and is described below together with FIG. 1.

Figure 1:
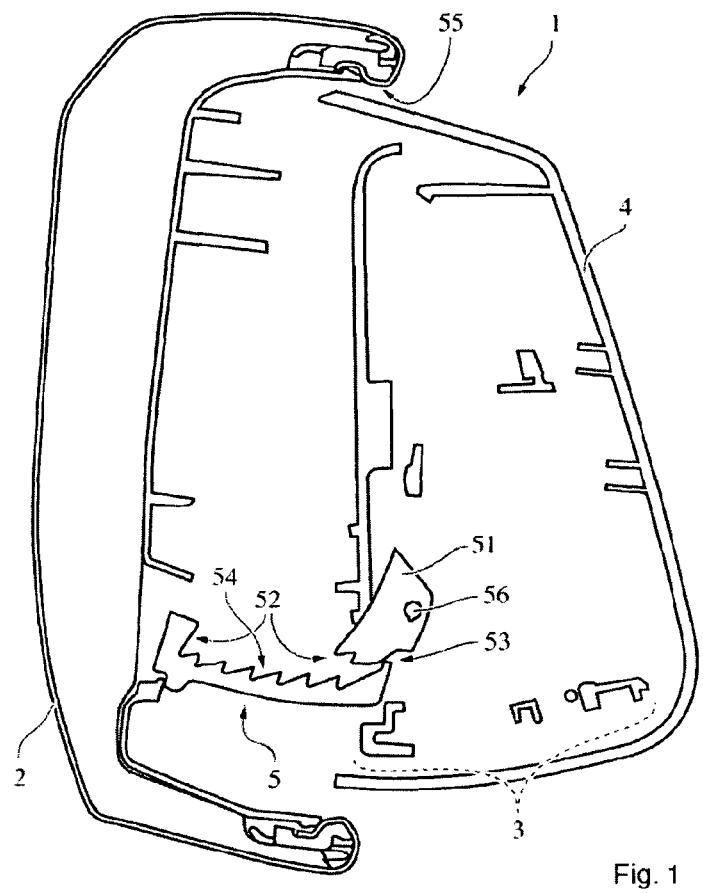
FIG. 1 shows a schematic section through a headrest according to the invention.

The headrest 1 has a main body 2, which is connected rigidly or, if appropriate, in a vertically adjustable manner to a backrest (not shown) of a vehicle seat via paired mounting rods (not shown). The main body 2 is connected to a padded part 4, and the padded part 4 can be moved forward relative to the main body 2, toward the back of the head of a vehicle occupant (to the right in the illustration according to FIG. 1), and rearward, away from the back of the head of the vehicle occupant (to the left in the illustration according to FIG. 1). The padded part 4 can have a safety device 3, which carries out an additional movement of the contact surface of the padded part 4 toward the head of the seat occupant if there is a special situation, e.g. an accident (a "rear crash" for instance, in which an excessive clearance between the contact surface of the padded part 4 and the head of the seat occupant can lead to "whiplash" due to the impact, something that the safety device is intended to prevent).

According to the invention, provision is made, in particular, for the movement of the padded part 4 relative to the main body 2 carried out for comfort purposes to be provided by means of a rotary motion or a pivoting motion about an axis of rotation 55. This allows particularly simple and intuitive operation of the comfort-adjustment means of the headrest 1 according to the invention. According to the invention, it is particularly preferred if the axis of rotation 55 extends approximately horizontally, and, as a very particularly preferred option, extends in the upper region of the headrest or of the main body 2.

A comfort-adjustment device 5 is provided within the headrest 1, between the padded part 4 and the main body 2. By means of the comfort-adjustment device 5, the padded part 4 can be moved. For this purpose, the comfort-adjustment device 5 has two control elements 51, which can be set in a locking position and in an unlocking position. In FIG. 1, the padded part 4 is shown in an extreme position (furthest away from the head of the seat occupant) and one of the control elements 51 is shown set in the unlocking position thereof. In the example illustrated, the comfort-adjustment device 5 has latching teeth 54 for each control element, and the latching teeth are in engagement with the control element 51 (not shown in FIG. 1) when the control element 51 is in the locking position thereof, which must be imagined as rotated to the left by about 20° to 40° (about another axis of rotation 56) relative to the setting thereof illustrated in FIG. 1.

In the extreme position (shown in FIG. 1) of the padded part 4, an adjustment of the control element 51 into the unlocking position thereof takes place through contact (or through collision) between two second stop surfaces 53. Through this contact or collision, the second stop surfaces 53 bring about a clockwise rotation of the control element 51 (about the further axis of rotation 56), thus setting the unlocking position of the control element 51. In the unlocking position of the control element 51, the padded part 4 can be moved as desired either toward the head of the occupant (generally forward) or in the opposite direction, that is to say generally rearward. According to the invention, the padded part 4 can preferably be preloaded into the rear position, e.g. by means of a preloading spring or some other mechanical or electrical energy storage device. As a preferred option in accordance with the invention, this prevents the padded part from being in undefined states of adjustment.

If the padded part is adjusted to a further extreme position (fully rearward), two first stop surfaces 52 touch (or strike against one another), with the result that the control elements 51 are set to the locking position thereof (by counterclockwise rotation about the further axis of rotation 56 in accordance with the illustration in FIG. 1). In this locking position of the control elements 51, the control elements 51 are latched with the latching teeth 54 against a rearward movement (i.e. away from the head of the user) of the padded part 4 (i.e. there cannot be any movement in said direction) and are not latched against a forward movement (i.e. toward the head of the user) of the padded part 4 (i.e. the padded part 4 can be adjusted in incremental steps into various positions of adjustment). According to the invention, the control elements 51 are, in particular, moved together with the padded part 4, and the latching teeth 54 are connected to the main body 2. As an alternative, it is also possible for the reverse arrangement to be provided.

Figure 2:
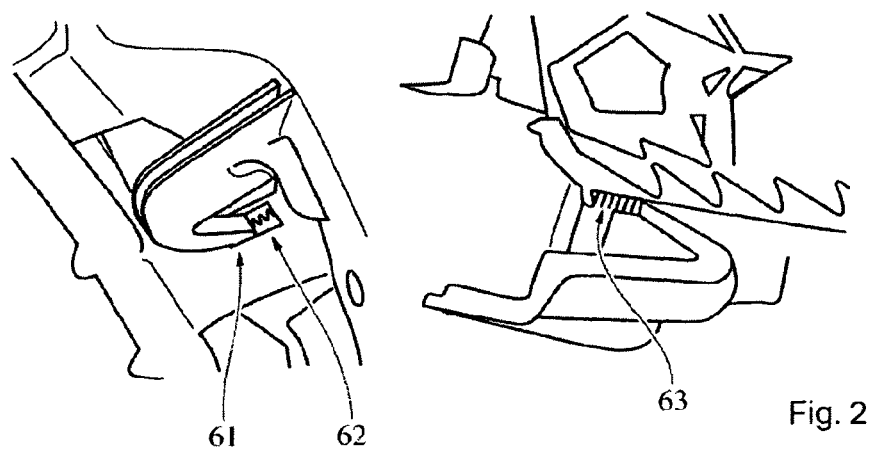
FIG. 2 shows two schematic detail views of a headrest according to the invention as shown in FIG. 1.

According to the invention, it is preferred if the adjustment force required to move the padded part 4 from the first position thereof toward the second position thereof is increased in the region of the (front) extreme position. In particular, it is preferred if the padded part 4 can be adjusted to a plurality of latching positions, wherein the adjustment force required for adjustment from the first position toward the second position of the padded part 4 is increased after the last latching position (that can be set in a latchable manner) before the (front) extreme position. According to the invention it is thereby advantageously possible for the last latching position or detent position of the padded part before unlocking to be recognized reliably and clearly by the user, thus enabling the forwardmost latchable position of adjustment to be achieved reliably, even in the case of first-time operation of the comfort-adjustment means. To bring about an increased adjustment force in the region of the extreme position, a counterstop 61 and a spring 62 (left-hand detail view in FIG. 2) or a spring mounting 63 in the end stop (right hand detail view in FIG. 2) are shown in the detail views in FIG. 2. According to the invention, it is possible in general for a leaf spring and/or a spiral spring and/or a buffer function to be provided, for example, in order to increase the adjustment force, wherein the buffer function can be provided, in particular, by means of a rubber material and/or by means of a foam material and/or by means of a linear damper element and/or by means of a rotation damper element around the axis of rotation 55.

In FIGS. 3 to 6, the headrest 1 according to the invention is shown with two control elements 51, wherein the control elements 51 are synchronized with one another. For synchronization of the two control elements 51, provision is preferably made, according to the invention, for this to be accomplished by means of a synchronization rod 57. In each case, the control elements 51 and corresponding latching teeth 54 provided for each control element 51 are provided, for example, in the lateral region to the right and to the left on both sides of the headrest 1. Actuation of the comfort-adjustment device 5 of the headrest in such a way that one of the control elements 51 is moved into the locking position thereof or into the unlocking position thereof has the effect that, owing to the synchronization between the control elements 51, a similar movement of the other control element 51 into the locking position or the unlocking position is also brought about, thus making possible particularly convenient, reliable and pleasant use of the comfort-adjustment device 5 of the headrest 1 in a particularly advantageous manner.

Figure 3:
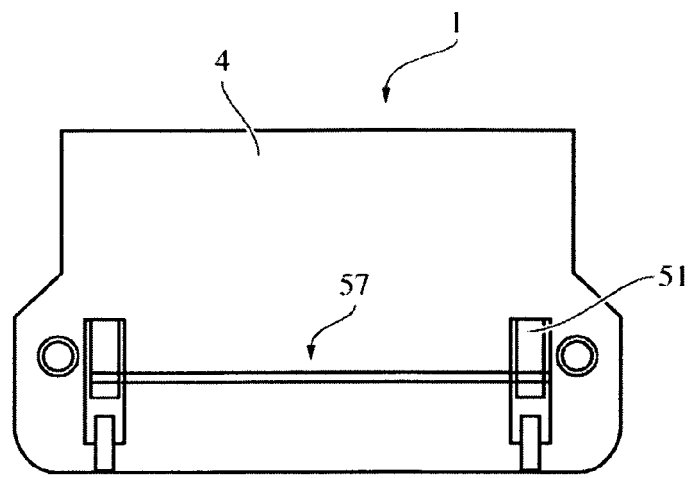
FIGS. 3 to 6 show a headrest according to the invention having two control elements, which are synchronized with one another.
Figure 4:
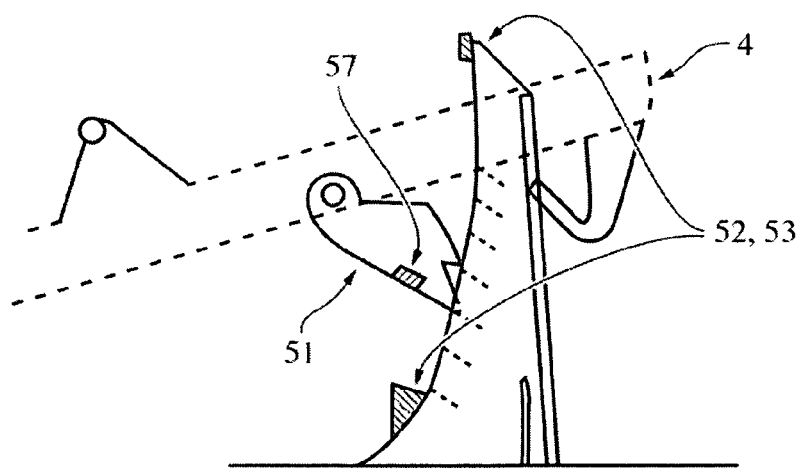
Figure 5:
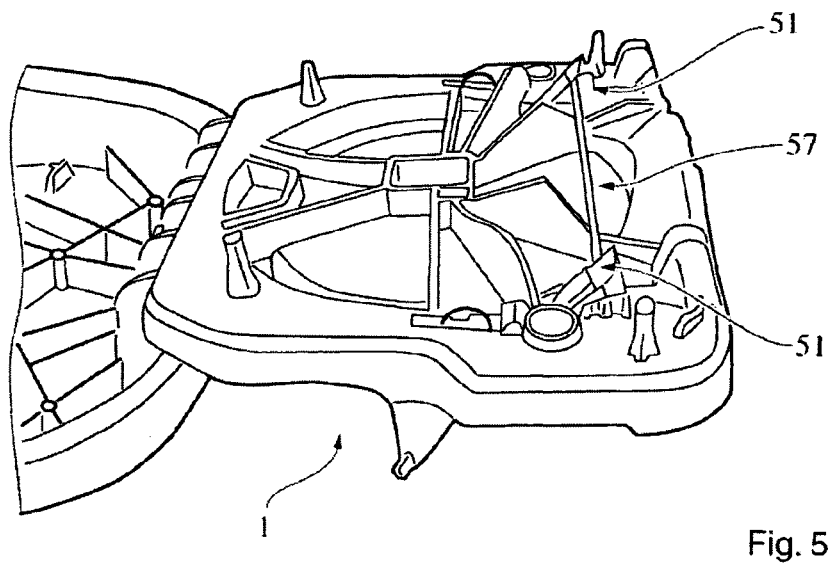
Figure 6:
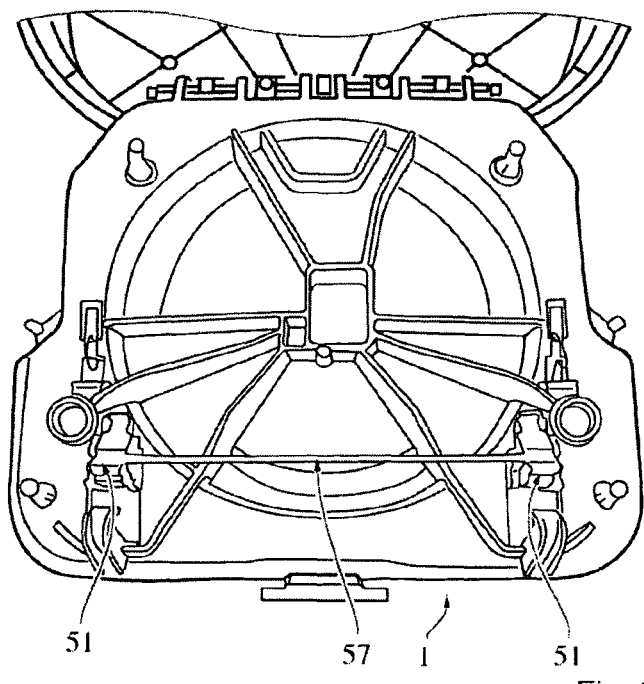

FIG. 3 shows schematically part of the headrest 1, wherein, in FIG. 3, the padded part 4 or front panel, the two control elements 51 and the synchronization rod are shown. FIG. 4 shows a detail view of the latching mechanism between the padded part or front panel 4 and the main body by means of the control elements 51 or detent elements, the latching teeth 54 and the synchronization rod 57. FIGS. 5 and 6 show perspective views of the headrest arrangement with the synchronization rod 57.

LIST OF REFERENCE SIGNS 1 headrest
2 main body
3 safety device
4 padded part
5 comfort-adjustment device
51 control element
52 first stop surfaces
53 second stop surfaces
54 latching teeth
55 axis of rotation
56 further axis of rotation (of the control element)
57 synchronization rod
61 counterstop
62 spring
63 mounting of the spring in the end stop

The invention claimed is:

1. A headrest for a vehicle seat, the headrest comprising:
a padded part facing the head of a seat occupant;
a main body; and
a comfort-adjustment device disposed at a lower part of the padded part,
wherein, when the headrest is in use, the padded part can be adjusted by the comfort-adjustment device relative to the main body by movement of the padded part from a first position, in which it is further away from the head of the seat occupant, to a second position, closer to the head of the seat occupant,
wherein the movement of the padded part is a pivoting movement of the padded part about an axis of rotation extending substantially horizontally,
wherein the axis of rotation is at an upper part of the padded part, such that the lower part of the padded part is displaced toward the head of the seat occupant more than the upper part during the movement of the padded part from the first position to the second position,
wherein the comfort-adjustment device has two control elements, which can be set in a locking position and in an unlocking position, the movement of the control elements being synchronized, and
wherein a direct movement of the padded part from the first position to the second position is possible when the control elements are in the locking position, but a movement of the padded part in the opposite direction is blocked and, when the control elements are in the unlocking position, a direct movement of the padded part from the first position to the second position and from the second position to the first position is possible.

2. The headrest as claimed in claim 1, wherein the synchronization of the control elements is provided by a synchronization rod,
wherein the padded part can also be adjusted by the comfort-adjustment device from the second position in the direction of the first position, this requiring the setting of an extreme forward position of the padded part, and
wherein the adjustment force required to move the padded part from the first position thereof toward the second position thereof is increased in the region of the extreme forward position.

3. The headrest as claimed in claim 1, wherein the main body is configured to receive a portion of the padded part when in the first position.

4. The headrest as claimed in claim 1, wherein the main body is configured to cover a portion of the padded part facing away from the head of a seat occupant.

* * * * *